US006824834B2

(12) United States Patent
Schafheutle et al.

(10) Patent No.: US 6,824,834 B2
(45) Date of Patent: Nov. 30, 2004

(54) COATING COMPOSITION

(75) Inventors: Markus A. Schafheutle, Graz (AT); Ulrike Kuttler, Vasoldsberg (AT); Anton Arzt, Neutillitsch (AT); Julius Burkl, Graz (AT)

(73) Assignee: Solutia Austria GmbH (AT)

( * ) Notice: Subject to any disclaimer, the term of this patent is extended or adjusted under 35 U.S.C. 154(b) by 213 days.

(21) Appl. No.: 10/288,813

(22) Filed: Nov. 6, 2002

(65) Prior Publication Data

US 2003/0096120 A1 May 22, 2003

(30) Foreign Application Priority Data

Nov. 19, 2001 (AT) .................................... A 1819/2001

(51) Int. Cl.[7] ............................................ C09D 175/04

(52) U.S. Cl. ............................... 427/388.2; 427/388.3; 427/388.4; 524/539; 524/591; 525/124; 525/440; 525/454; 525/458

(58) Field of Search .......................... 427/388.2, 388.3, 427/388.4; 524/539, 591; 525/124, 440, 454, 458

(56) References Cited

U.S. PATENT DOCUMENTS

| | | | | |
|---|---|---|---|---|
| 3,124,605 A | | 3/1964 | Wagner | |
| 3,358,010 A | | 12/1967 | Britain | |
| 3,412,054 A | | 11/1968 | Milligan et al. | |
| 3,640,924 A | | 2/1972 | Hermann et al. | |
| 3,903,126 A | | 9/1975 | Woerner et al. | |
| 3,903,127 A | | 9/1975 | Wagner et al. | |
| 3,976,622 A | | 8/1976 | Wagner et al. | |
| 4,324,879 A | | 4/1982 | Bock et al. | |
| 5,494,956 A | | 2/1996 | Dworak | |
| 6,423,771 B1 | * | 7/2002 | Dworak et al. | 524/501 |
| 6,521,700 B1 | * | 2/2003 | Dworak et al. | 524/589 |

FOREIGN PATENT DOCUMENTS

| | | | |
|---|---|---|---|
| AT | 408 657 B | 6/2001 | C09D/7/12 |
| CA | 2 U33 530 A1 | 7/1991 | |
| DE | 39 18 510 A1 | 12/1990 | |
| EP | 0 424 697 A2 | 5/1991 | |
| EP | 0 524 511 A1 | 1/1993 | |
| GB | 1 475 348 | 10/1974 | C09D/3/49 |
| GB | 1 549 459 B2 | 12/1976 | C08L/75/04 |

* cited by examiner

*Primary Examiner*—David J. Buttner
(74) *Attorney, Agent, or Firm*—Connolly Bove Lodge & Hutz LLP

(57) ABSTRACT

Coating composition especially for preparing automotive surfacers, comprising a condensation product A of a carboxyl-containing resin A1 and a hydroxyl-containing resin A2, a curing agent C which becomes active only at an elevated temperature of at least 80° C., and a high molecular mass polyurethane B.

8 Claims, No Drawings

COATING COMPOSITION

FIELD OF THE INVENTION

The invention relates to a coating composition suitable in particular for producing coatings on automobile parts. The parts thus coated, especially those where the coating composition described here is used to produce a surfacer coat, are notable for especially high stone-chip resistance.

BACKGROUND OF THE INVENTION

In DE-A 39 18 510, conventional baking surfacers based on blocked isocyanates and polyesters (in solution in organic solvents) are described.

In EP-A 0 249 727, aqueous surfacer coating compositions are described based on phosphoric-acid-modified epoxy resins, water-dilutable polyesters as known from AT-B 328 587, and water-dilutable melamine resins. DE-A 40 00 748 relates to aqueous surfacer coating compositions comprising water-dilutable hydroxyl-containing polyurethane resins, which may if desired include other, admixed binders, and aqueous amino resins as curing agents. Mixtures of water-dilutable polyurethane resins, of water-dilutable polyesters modified with epoxy resin, and, if desired, of water-dilutable amino resins are known from DE-A 38 13 866. Other aqueous surfacer coating compositions based on carboxyl-containing polyesters or acrylic copolymers and water-soluble blocked isocyanate prepolymers, alone or in combination with water-dilutable amine resins, are described in DE-A 38 05 629. EP 0 594 685 relates to the use of condensation products of carboxyl-containing polyurethane resins and hydroxyl-containing polyester resins, with or without urethane modification, together with water-insoluble blocked isocyanates for producing stoving enamels. An improvement of this formulation with reduced sensitivity to so-called overbaking is known from EP-A 0 548 873, the improvement being achieved by adding a water-soluble amine resin as crosslinker.

Further-improved systems for aqueous surfacers are described, for example, in applications AT 2171/99, AT 2172/99, and AT 2173/99. Although these binders are improved in particular with respect to solids content and also in the stone-chip resistance, weaknesses are still evident. There is therefore evidently still a need for further optimization of the cured paint film in respect of its elasticity and strength.

SUMMARY OF THE INVENTION

It is the object of the invention, therefore, to make further improvements in the stone-chip resistance of aqueous binders for surfacer materials which are used in the line production of automobiles.

It has now been found that adding an aqueous dispersion of a particularly high molecular mass polyurethane to condensation products of hydroxyl-containing and carboxyl-containing resins and combining this mixture with curing agents which become active on heating make it possible to obtain aqueous coating compositions whose stone-chip resistance after baking is improved relative to that of the known systems.

The invention accordingly provides a coating composition comprising

- a condensation product A of a carboxyl-containing resin A1 and a hydroxyl-containing resin A2, A1 preferably having an acid number of from 100 to 230 mg/g, in particular from 120 to 160 mg/g, and A2 preferably having a hydroxyl number of from 50 to 500 mg/g, in particular from 60 to 350 mg/g,
- a water-soluble or water-dispersible, high molecular mass polyurethane B having a number-average molar mass $M_n$ (measured by gel permeation chromatography, calibration with polystyrene standards) of at least 10 kg/mol, preferably at least 15, and with particular preference at least 20 kg/mol, and a weight-average molar mass $M_w$ of at least 20 kg/mol, preferably at least 30, and with particular preference at least 40 kg/mol, the acid number of the polyurethanes B being preferably from 20 to 50 mg/g, in particular from 25 to 45 mg/g, and
- a curing agent C which becomes active only at an elevated temperature of at least 80° C.

DETAILED DESCRIPTION OF THE PREFERRED EMBODIMENTS

It has also been found that said high molecular mass polyurethane can also be used as the sole binder in the formulation of surfacers. The present invention therefore further provides for the use of the polyurethane B to formulate surfacer materials, and also provides surfacer materials comprising the polyurethane B as sole binder or in a combination in which the binder includes a mass fraction of at least 80% of the polyurethane B.

The acid number is defined in accordance with DIN 53 402 as the ratio of that mass $m_{KOH}$ of potassium hydroxide required to neutralize a sample under analysis to the mass $m_B$ of this sample (mass of the solids in the sample in the case of solutions or dispersions); its customary unit is "mg/g". The hydroxyl number is defined in accordance with DIN 53 240 as the ratio of that mass $m_{KOH}$ of potassium hydroxide which has exactly the same number of hydroxyl groups as a sample under analysis to the mass $m_B$ of this sample (mass of the solids in the sample in the case of solutions or dispersions); its customary unit is "mg/g".

The polyurethane resin contains units derived from polyisocyanates BA, polyols BB having a number-average molar mass $M_n$ of at least 400 g/mol, low molar mass polyols BC with $M_n$ below 400 g/mol, if desired, compounds BD which contain at least two groups which are reactive toward isocyanate groups and at least one group which is capable of forming anions, low molar mass polyols BE, which carry no further reactive groups in relation to isocyanate groups, compounds BF, which are monofunctional toward isocyanates or contain active hydrogen of different reactivity and are different from the compounds BE, and also, if desired, compounds BG, which are different from BB, BC, BD, BE, and BF and contain at least two groups which are reactive with NCO groups.

The Staudinger Index of the polyurethane resin B, measured in N-methylpyrrolidone/chloroform as solvent, is at least 20 $cm^3$/g, preferably at least 22 $cm^3$/g, and in particular at least 24 $cm^3$/g. The formerly so-called "limiting viscosity number", called "Staudinger Index" $J_g$ in accordance with DIN 1342, Part 2.4, is the limiting value of the Staudinger function $J_v$ at decreasing concentration and shear stress, $J_v$ being the relative change in viscosity based on the ma ssconcentration $\beta_B=m_B/V$ of the dissolved substance B (with the mass $m_B$ of the substance in the volume V of the solution); i.e., $J_v=(\eta-1)/\beta_B$. Here, $\eta_r-1$ is the relative change in viscosity, in accordance with $\eta_r-1=(\eta-\eta_s)/\eta_s$. The relative viscosity $\eta_r$ is the ratio of the viscosity $\eta$ of the solution under analysis to the viscosity $\eta_s$ of the pure solvent. (The physical definition of the Staudinger Index is that of a specific hydrodynamic volume of the solvated polymer coil at infinite dilution and in the state of rest.) The unit commonly used for J is "$cm^3$/g"; frequently also "dl/g".

The condensation product A preferably has an acid number of from 25 to 75 mg/g, in particular from 30 to 50 mg/g. Its Staudinger Index ("limiting viscosity number") is usually from 10 to 20 $cm^3$/g, in particular from 12 to 19 $cm^3$/g, and with particular preference from 13 to 18 $cm^3$/g. It is prepared using components A1 and A2 preferably in a mass ratio of from 10:90 to 80:20, in particular from 15:85 to 40:60.

The resins A1 containing carboxyl groups are preferably selected from polyester resins A11, polyurethane resins A12, the so-called maleate oils A13, fatty acids and fatty acid mixtures grafted with unsaturated carboxylic acids A14, and acrylate resins A15. Preferably, the acid number of the resins A1 is from 100 to 230 mg/g, in particular from 70 to 160 mg/g. Their Staudinger Index, measured in dimethylformamide as solvent at 20° C., is generally from about 6.5 to 12 $cm^3$/g, preferably from 8 to 11 $cm^3$/g.

Suitable polyester resins A11 may be prepared in a conventional manner from polyols A111 and polycarboxylic acids A112, it also being possible for some—preferably up to 25%—of the amount of substance of the polyols and polycarboxylic acids to be replaced by hydroxycarboxylic acids A113. By appropriate choice of the nature and amount of the starting materials A111 and A112 it is ensured that the resulting polyester has a sufficient number of acid groups, in accordance with the acid number indicated above. The polyols A111 are preferably selected from aliphatic and cycloaliphatic alcohols having 2 to 10 carbon atoms and on average at least two hydroxyl groups per molecule; glycol, 1,2- and 1,3-propanediol, 1,4-butanediol, 1,6-hexanediol, neopentyl glycol, di- and triethylene glycol, di- and tripropylene glycol, glycerol, trimethylolpropane and trimethylolethane are particularly suitable. Suitable polycarboxylic acids A112 are aliphatic, cycloaliphatic and aromatic polycarboxylic acids such as adipic acid, succinic acid, cyclohexanedicarboxylic acid, phthalic acid, isophthalic and terephthalic acids, trimellitic acid and trimesic acid, and benzophenonetetracarboxylic acid. It is also possible to use compounds having both carboxylic acid groups and sulfonic acid groups, such as sulfoisophthalic acid, for example.

Suitable polyurethane resins A12 may be prepared by reacting aliphatic polyols A121, as defined under A111, hydroxyalkanecarboxylic acids A122 having at least one, preferably two, hydroxyl groups and a carboxyl group which under esterification conditions is less reactive than adipic acid; preference is given to the use of dihydroxymonocarboxylic acids selected from dimethylolacetic acid, dimethylolbutyric acid and dimethylolpropionic acid; oligomeric or polymeric compounds A125 having on average at least two hydroxyl groups per molecule, which may be selected from polyether polyols A1251, polyester polyols A1252, polycarbonate polyols A1253, saturated and unsaturated dihydroxyaliphatic compounds A1254, which are obtainable by oligomerizing or polymerizing dienes having 4 to 12 carbon atoms, especially butadiene, isoprene and dimethylbutadiene, followed by functionalization in a known manner, and also polyfunctional isocyanates A123, selected preferably from aromatic, cycloaliphatic and also linear and branched aliphatic difunctional isocyanates such as tolylene diisocyanate, bis(4-isocyanatophenyl)methane, tetramethylxylylene diisocyanate, isophorone diisocyanate, bis(4-isocyanatocyclohexyl)methane, hexamethylene diisocyanate and 1,6-diisocyanato-3,3,5- and -3,5,5-trimethylhexane.

Particular preference is given to those polyurethane resins A12 which are prepared by reacting a mixture of one or more polyols A121 with a hydroxyalkanecarboxylic acid A122 and at least one polyfunctional isocyanate A123 which has been at least partly blocked, usually to the extent of more than 20%, preferably to the extent of more than 35% and, in particular, to the extent of 50% or more with monohydroxy compounds A124 selected from polyalkylene glycol monoalkyl ethers HO—$(R^1—O)_n$—$R^2$ where $R^1$ is a linear or branchedalkylene radical having 2 to 6, preferably 2 to 4 carbon atoms and $R^2$ is an alkyl group of from 1 to 8, preferably 2 to 6 carbon atoms and oximes of aliphatic ketones having 3 to 9 carbon atoms, n is an integer from 2 to 100, preferably 3 to 60, and particularly preferred 4 to 40. The degree of blocking is stated here as the fraction of the blocked isocyanate groups, based on the total isocyanate groups present (blocked and unblocked) in the isocyanate A123. It is further preferred to prepare the polyurethane resins A21 by reacting a mixture of a non-blocked polyfunctional isocyanate and a polyfunctional isocyanate which is blocked as described above with the hydroxyalkanecarboxylic acid A122 and the polyols A121 and A125, the mixing proportions being chosen so that each molecule of the polyurethane A21 contains on average one or more than one terminal blocked isocyanate group.

"Maleate oil" A13 is a term used to denote reaction products of (drying) oils A131 and olefinically unsaturated carboxylic acids A132, especially dicarboxylic acids. Oils used as A131 are preferably drying and semidrying oils such as linseed oil, tallow oil, rapeseed oil, sunflower oil and cottonseed oil, having iodine numbers of from about 100 to about 180. The unsaturated carboxylic acids A132 are selected so that under the customary conditions they graft free-radically (following addition of initiators or following heating) onto the initial charge of oils with a yield (fraction of the unsaturated carboxylic acids bonded to the oil after reaction, based on the amount used for the reaction) of more than 50%. Particularly suitable is maleic acid in the form of its anhydride, as are tetrahydrophthalic anhydride, acrylic and methacrylic acid, and also citraconic, mesaconic and itaconic acid.

Other suitable resins A14 are fatty acids or fatty acid mixtures A141 grafted with the unsaturated acids specified under A132, said fatty acids or fatty acid mixtures A141 being obtainable in industrial amounts by saponification of fats. The appropriate fatty acids have at least one olefinic double bond in the molecule; those which may be listed by way of example include oleic acid, linoleic and linolenic acid, ricinoleic acid and elaidic acid, and also the stated technical-grade mixtures of such acids.

Further suitable resins A15 are the acidic acrylate resins obtainable by copolymerization of olefinically unsaturated carboxylic acids A151 and other vinyl or acrylic monomers A152. The carboxylic acids are those already mentioned under A132, and also vinylacetic acid and crotonic and isocrotonic acid and the monoesters of olefinically unsaturated dicarboxylic acids, such as monomethyl maleate and monomethyl fumarate, for example. Suitable monomers A152 are the alkyl esters of acrylic and methacrylic acid having preferably from 1 to 8 carbon atoms in the alkyl group, (meth)acrylonitrile, hydroxyalkyl (meth)acrylates having 2 to 6 carbon atoms in the alkyl group, styrene, vinyltoluene, and vinyl esters of aliphatic linear and branched carboxylic acids having 2 to 15 carbon atoms, especially vinyl acetate and the vinyl ester of a mixture of branched aliphatic carboxylic acids having on average 9 to 11 carbon atoms. It is also advantageous to copolymerize the monomers specified under A151 and A152 in the presence of compounds A153 which react with the unsaturated carboxylic acids by addition and formation of a carboxy- or hydroxy-functional, copolymerizable compound. Examples of such compounds are lactones A1531, which react with the carboxylic acids A151 with ring opening to form a carboxy-functional unsaturated compound, and epoxides A1532, especially glycidyl esters of a-branched saturated aliphatic acids having 5 to 12 carbon atoms, such as of neodecanoic acid or neopentanoic acid, which react with the acid A151 by addition to give a copolymerizable compound containing a hydroxyl group. The amounts of substance of the compounds used should be such that the required acid number is reached. If this compound A153 is introduced as the initial charge and the polymerization is conducted so that this compound is used as (sole) solvent, solvent-free acrylate resins are obtained.

Suitable hydroxyl group-containing resins A2 are, in particular, polyesters A21, acrylate resins A22, polyurethane resins A23, and epoxy resins A24. The hydroxyl number of the resins A2 is generally from about 50 to 500 mg/g, preferably from about 60 to 350 mg/g, and with particular preference from 70 to 300 mg/g. Their Staudinger Index, measured at 20° C. in dimethylformamide as solvent, is preferably from 8 to 13 $cm^3/g$, in particular from 9.5 to 12 $cm^3/g$.

The polyesters A21 are prepared like the component A11 by polycondensation; in this case all that is necessary is to select the nature and amount of the starting materials such that there is an excess of hydroxyl groups over the acid groups, it being necessary for the condensation product to have the hydroxyl number indicated above. This can be achieved by using polyhydric alcohols containing on average at least two, preferably 2.1, hydroxyl groups per molecule, with dicarboxylic acids or with a mixture of poly- and monocarboxylic acids containing on average not more than two, preferably from 1.5 to 1.95, acid groups per molecule. Another possibility is to use a corresponding excess of hydroxyl components (polyols) A211 over the acids A212. The polyols A211 and the polyfunctional acids A212 which are reacted in the polycondensation reaction to give the hydroxyl group-containing polyesters A21 are selected from the same groups as the polyols A111 and the acids A112. It is likewise possible here to replace some of the polyols and acids by hydroxy acids A113. The aim is for the acid number of component A2 not to exceed 20 mg/g and to be preferably below 18 mg/g. The acid number may be reduced, for example, by reacting the condensed polyester A21 with a small amount of monofunctional aliphatic alcohols A114 under esterification conditions. The amount of alcohols A114 is such that, although the acid number is reduced below the limit, the Staudinger Index does not fall beyond the stated lower limit. Examples of suitable aliphatic alcohols are n-hexanol, 2-ethylhexanol, isodecyl alcohol and tridecyl alcohol.

The hydroxyl group-containing acrylate resins A22 are obtainable by normally free-radically initiated copolymerization of hydroxyl group-containing acrylic monomers A221 with other vinyl or acrylic monomers A222 without such functionality. Examples of the monomers A221 are esters of acrylic and methacrylic acid with aliphatic polyols, especially diols having 2 to 10 carbon atoms, such as hydroxyethyl and hydroxypropyl (meth)acrylate. Examples of the monomers A222 are the alkyl esters of (meth)acrylic acid having 1 to 10 carbon atoms in the alkyl group such as methyl, ethyl, n-butyl and 2-ethylhexyl (meth)acrylate, (meth)acrylonitrile, styrene, vinyltoluene, vinyl esters of aliphatic monocarboxylic acids having 1 to 10 carbon atoms such as vinyl acetate and vinyl propionate. Preference is also given to those acrylate resins prepared not, as is usual, in solution but instead in a bulk polymerization in which the initial charge comprises a liquid cyclic compound (see above, A153) which acts as solvent during the polymerization reaction and which by means of ring opening forms a copolymerizable compound on reaction with one of the monomers used. Examples of such compounds are glycidyl esters of α-branched aliphatic monocarboxylic acids, especially the acids or acid mixtures available commercially as neopentanoic acid or neodecanoic acid, and also lactones such as ϵ-caprolactone or δ-valerolactone. If these glycidyl esters are used, then during the polymerization it is necessary to use comonomers containing acid groups, such as (meth)acrylic acid, in an amount which is at least equimolar to the amount of substance of the epoxide groups. The lactones may be used, with ring opening, both with hydroxyl group-containing comonomers and with comonomers containing acid groups.

Hydroxyl group-containing polyurethane resins A23 are obtainable in a known manner by addition reaction of oligomeric or polymeric polyols A231 selected from polyester polyols, polyether polyols, polycarbonate polyols and polyolefin polyols, and, if desired, low molar mass aliphatic diols or polyols A233 having 2 to 12 carbon atoms, such as ethylene glycol, 1,2- and 1,3-propylene glycol, 1,4-butanediol, 1,6-hexanediol, di- and triethylene and/or -propylene glycol, neopentyl glycol, trimethylolpropane, pentaerythritol, and polyfunctional isocyanates A232, the latter being used in a substoichiometric amount such that the number of hydroxyl groups in the reaction mixture is greater than the number of isocyanate groups. Suitable polyols are, in particular, oligomeric and polymeric dihydroxy compounds having a number-average molar mass $M_n$ of from about 200 to 10,000 g/mol. By means of polyaddition with polyfunctional, especially difunctional, isocyanates, they are built up to the target value for the Staudinger Index of at least 8 $cm^3/g$, preferably at least 9.5 $cm^3/g$.

Epoxy resins A24 obtainable by reacting epichlorohydrin with aliphatic or aromatic diols or polyols, especially bisphenol A, bisphenol F, resorcinol, novolaks or oligomeric polyoxyalkylene glycols having 2 to 4, preferably 3 carbon atoms in the alkylene group, have at least one hydroxyl group per epichlorohydrin molecule used. Instead of the reaction of epichlorohydrin with diols, it is also possible to prepare the appropriate epoxy resins by the so-called advancement reaction from diglycidyl ethers of diols (such as those mentioned above) or diglycidyl esters of dibasic organic acids with the stated diols. All known epoxy resins may be used here, provided they satisfy the condition for the hydroxyl number.

As curing agent C it is possible to use blocked isocyanates C1 which have not been hydrophilically modified or have been hydrophilically modified only to a minor extent of less than 20% of their mass. Preference is given to blocked isocyanates obtainable in a conventional manner from diisocyanates such as tolylene diisocyanate, isophorone diisocyanate, bis(4-isocyanato-phenyl)methane, 1,6-diisocyanatohexane, tetramethyl-xylylene diisocyanate and also the allophanates, biurets or uretdiones formed from these diisocyanates, and customary blocking agents. These are, for example, linear or branched aliphatic alcohols with 3 to 20 carbon atoms, preferably 2-ethylhexanol; phenols such as phenol itself; glycol monoesters, the glycols possibly being monomeric or oligomeric alkylene glycols such as glycol itself, 1,2- and 1,3-propanediol, 1,4-butanediol, diand triethylene glycol, di- and tripropylene glycol, and the acid being selected from aliphatic monocarboxylic acids having 1 to 10 carbon atoms, preferably acetic acid; glycol monoethers, the glycols corresponding to those mentioned above and the etherifying component being selected from aliphatic lower alcohols having 1 to 8 carbon atoms, preferably butyl glycol; or ketoximes of aliphatic ketones with 3 to 10 carbon atoms, such as butanone oxime, for example. Particular preference is given to using 3,5-dimethylpyrazole as blocking agent, since it is not toxic and does not yellow even at temperatures of 180° C. or more. The blocking agents are customarily chosen such that the elimination temperature is between 80 and 180° C. Blocked isocyanates based on isophorone diisocyanate and 1,6-diisocyanatohexane are particularly preferred. Blocked isocyanates have urethane groups or urea groups instead of isocyanate groups, but these groups are regenerated upon cleavage.

As a further curing component it is possible to use a water-dilutable amino resin C2 in a mass fraction of up to 20%, based on the mass of the overall curing component. Where a hydrophilically modified blocked isocyanate C11 is used, the amount of the amino resin C2 and of said isocyanate C11 must be such that the sum of the mass fractions of all water-dilutable curing components does not exceed 20%.

The amino resin C2 is used preferably in partly or fully etherified form. Particularly suitable are melamine resins such as hexamethoxymethylmelamine, grades etherified with butanol or with mixtures of butanol and methanol, and also the corresponding benzoguanamine, caprinoguanamine or acetoguanamine resins which comprise these guanamines in combination with melamine.

Preferentially, the polycondensate A is formulated with a portion of the curing agent C to give a self-curing binder AC, the polycondensate A in this embodiment being mixed with a blocked isocyanate Cl. The mass ratio of polycondensate A to curing component Cl is then preferably from about 85:15 to 55:45, in particular from 80:20 to 60:40, and with particular preference from 75:25 to 65:35, the ratio being based in each case on the mass of the solids. In this embodiment, moreover, the curing agent includes a fraction of amino resins C2, the ratio of the mass of the amino resin C2 to the mass of the polyurethane B being from about 1:10 to 1:4.

Preference is given to using compositions which include the following mass fractions of the components:

from 2 to 30% of the polyurethane B preferably from 5 to 25%, and with particular preference from 7 to 23%, from 0.3 to 6% of the curing agent C2, preferably from 0.9 to 4.5%, and with particular preference from 1.2 to 4.2%, and from 64 to 97.7% of the self-curing binder AC, preferably from 70.5 to 94.1%, and with particular preference from 72.8 to 91.8%.

Particularly high hardness and good gloss are achieved when the mass fraction of the polyurethane B is from 8 to 15%, the mass fraction of the curing agent C2 is from 1.4 to 2.7%, and the remainder of the binder composition consists of the self-curing binder AC.

The stated values for the mass fractions always denote mass fractions of the solids of said substances based on the mass of the solids of the mixtures.

The hydrophilic blocked isocyanates C11 which may be used in minor amounts together with the blocked isocyanates C1 are known, inter alia, from the following documents:

In EP-A 0 424 697, hydrophilic blocked isocyanates are described obtainable by reacting a carboxyl-containing polyether polyol, a diisocyanate, and a blocking agent. These isocyanates are used to impregnate fibers and for subsequent production of sheetlike structures therefrom.

In EP-A 0 524 511, a process for preparing aqueous dispersions of blocked isocyanates is described by reacting blocking agents in an aqueous dispersion with isocyanates hydrophilicized by means of cationic, anionic or nonionic structures.

In EP-A 0 576 952, water-soluble or water-dispersible mixtures of blocked isocyanates are described which are obtained by reacting diisocyanates, a monofunctional blocking agent for isocyanates, a hydroxycarboxylic acid, a polyol component comprising a dihydric to hexahydric alcohol having a molar mass of from 62 to 182 g/mol, and a polyester diol component having a molar mass of from 350 to 950 g/mol.

In EP-A 0 012 348, a process for preparing water-dispersible or water-soluble blocked polyisocyanates is described, in which an at least half-blocked polyfunctional isocyanate is reacted with an amine sulfonate or with the corresponding acid.

In EP-A 0 566 953, water-soluble or water-dispersible blocked polyisocyanates are described which may be prepared from an isocyanate mixture having an average isocyanate functionality of from 2.5 to 3.5, a blocking agent, and an aliphatic monohydroxycarboxylic acid.

In DE-A 44 13 059, water-soluble blocked polyisocyanates are described, containing incorporated amino groups which can be converted into ammonium salt groups by neutralization with acids and which thus render the crosslinking agent hydrophilic.

In EP-A 0 486 881, a water-dilutable polyfunctional polyisocyanate is described, containing free isocyanate groups. The presence of these groups reduces the storage stability of those coating compositions which comprise these crosslinking agents.

According to the teaching of these documents the hydrophilically modified (i.e., water-soluble or water-dispersible) blocked isocyanates are obtained by reacting partly blocked polyfunctional isocyanates with hydrophilicizing compounds until all, or virtually all, of the isocyanate groups have been consumed. These hydrophilicizing compounds are selected from anionogenic compounds such as organic carboxylic, sulfonic or phosphonic acids containing at least one isocyanate-reactive group, selected preferably from hydroxyl, amino, hydrazine and mercapto groups, especially bishydroxyalkylcarboxylic acids such as dimethylolpropionic acid, it being possible for the reaction products thereof with isocyanates to be converted into the corresponding anions by addition of alkalis, and also from cationogenic compounds, especially organic amines containing at least one tertiary amino group and at least one of the abovementioned isocyanate-reactive groups, it being possible for the tertiary amino group to be converted into the corresponding ammonium cation by adding acids, following the reaction with the isocyanate. The third possibility for hydrophilicization is the reaction of the partly blocked isocyanates with nonionic hydrophilic compounds, especially those having a sufficient fraction of oxyethylene groups, which as is known may also be present together with oxypropylene groups in the compound in question.

The resins A are prepared from the polyhydroxy components A2 and the polycarboxyl components A1 under condensation conditions, i.e., at a temperature of from 80 to 180° C., preferably between 90 and 170° C., preferably in the presence of solvents which form azeotropes with the water formed during the condensation. The condensation is continued until the resins A have acid numbers of from about 25 to about 75 mg/g, at which point the Staudinger Index is from about 13.5 to 18 $cm^3/g$, preferably from 14.5 to 16.5 $cm^3/g$, in each case measured in dimethylformamide as solvent at 20° C. Following at least partial neutralization of the remaining carboxyl groups (with preferably from 10 to 80% of the carboxyl groups, with particular preference from 25 to 70%, being neutralized), the resins A are dispersible in water. During the condensation it may be observed that the initially cloudy reaction mass clarifies and forms a homogeneous phase.

The polyurethane resins B can be prepared by the following steps:

- synthesizing an isocyanate-functional prepolymer by reacting polyisocyanates BA with polyols BB having a number-average molar mass $M_n$ of at least 400 g/mol, low molar mass polyols BC, if desired, and compounds BD which have at least two groups which are reactive toward isocyanate groups and at least one group which is capable of forming anions, to give a prepolymer which contains free NCO groups and has a Staudinger Index $J_0$ of at least 15 $cm^3/g$, preferably at least 17 $cm^3/g$, and with particular preference at least 19 $cm^3/g$,
- at least partly neutralizing the group capable of forming anions in the compound BD to form anionic groups, dispersing this prepolymer in water, and
- reacting the neutralized prepolymer with at least one of the components selected from low molecular mass polyols BE, which carry no further reactive groups relative to isocyanate groups, these compounds being used in excess, compounds BF, which are monofunctional toward isocyanates or contain active hydrogen of different reactivity and are different from the compounds BE, and also, if desired, compounds BG, which are different from BB, BC, BD, BE and BF and contain at least two groups which are reactive with NCO groups.

The isocyanates BA are at least difunctional and may be selected from aromatic and aliphatic linear, cyclic or branched isocyanates, especially diisocyanates. Where aromatic isocyanates are used, they must be employed as a mixture with the stated aliphatic isocyanates. The fraction of the aromatic isocyanates is to be chosen such that the number of isocyanate groups being introduced into the mixture is at least 5% less than the number of isocyanate groups that remain after the first stage in the prepolymer produced. Diisocyanates are preferred, although up to 5% of their mass may be replaced by isocyanates with a functionality of 3 or more.

The diisocyanates preferably possess the formula $Q(NCO)_2$ in which Q stands for a hydrocarbon radical having from 4 to 40 carbon atoms, in particular from 4 to 20 carbon atoms, and preferably an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms or an araliphatic hydrocarbon radical having from 7 to 15 carbon atoms. Examples of diisocyanates of this kind for preferential use are tetramethylene diisocyanate, hexamethylene diisocyanate, dodecamethylene diisocyanate, 1,4-diisocyanatocyclohexane, 3-isocyanato-methyl-3,5,5-trimethylcyclohexyl isocyanate (isophorone diisocyanate, IPDI), 4,4'-diisocyanatodicyclohexyl-methane, 2,2-bis(4-isocyanatocyclohexyl)propane, 1,4-diisocyanatobenzene, 2,4- or 2,6-diisocyanatotoluene and/or mixtures of these isomers, 4,4'- or 2,4'-diiso-cyanatodiphenylmethane, 2,2-bis(4-isocyanatophenyl)-propane, p-xylylene diisocyanate, and α,α,α,α-tetra-methyl-m- or -p-xylylene diisocyanate, and mixtures of these compounds.

Polyisocyanates suitable in addition to these simple polyisocyanates include those containing heteroatoms in the radical linking the isocyanate groups. Examples thereof are polyisocyanates which contain carbodiimide groups, allophanate groups, isocyanurate groups, urethane groups, acylated urea groups or biuret groups. For further suitable polyisocyanates, refer for example to DE-A 29 28 552.

Also suitable are "paint polyisocyanates" based on hexamethylene diisocyanate or on 1-isocyanato-3,3,5-trimethyl-4-isocyanatomethylcyclohexane (IPDI) and/or bis(isocyanatocyclohexyl)methane, especially those based exclusively on hexamethylene diisocyanate. By "paint polyisocyanates" based on these diisocyanates are meant the derivatives of these diisocyanates which are known per se and contain biuret, urethane, uretdione and/or isocyanurate groups, and which following their preparation may have been freed, if desired, from excess starting diisocyanate in a known way, preferably by distillation, down to a residual mass fraction of less than 0.5%. The preferred aliphatic polyisocyanates for use in accordance with the invention include polyisocyanates which meet the above criteria, contain biuret groups, and are based on hexamethylene diisocyanate, such as may be obtained, for example, by the processes of U.S. Pat. Nos. 3,124,605, 3,358,010, 3,903,126, 3,903,127 or 3,976,622, and which are composed of mixtures of N,N,N-tris(6-isocyanatohexyl) biuret with minor amounts in its higher homologs, and also the cyclic trimers of hexamethylene diisocyanate which meet the stated criteria, as may be obtained in accordance with U.S. Pat. No. 4,324,879, which are composed essentially of N,N,N-tris(6-isocyanatohexyl) isocyanurate in a mixture with minor amounts of its higher homologs. Particular preference is given to the mixtures of polyisocyanates containing uretdione and/or isocyanurate groups which meet the stated criteria and are based on hexamethylene diisocyanate, such as are formed by catalytic oligomerization of hexamethylene diisocyanate using trialkylphosphanes as catalysts. Particular preference is given to the latter mixtures with a viscosity at 23° C. of from 50 to 20, 000 mPa·s and an NCO functionality of between 2.0 and 5.0.

In the case of the aromatic polyisocyanates, which are likewise suitable in accordance with the invention but are preferably to be used in a mixture with the abovementioned aliphatic polyisocyanates, the compounds in question are in particular "paint polyisocyanates" based on 2,4-diisocyanatotoluene or its technical-grade mixtures with 2,6-diisocyanatotoluene, or based on 4,4-diisocyanatodiphenylmethane or its mixtures with its isomers and/or higher homologs. Examples of aromatic paint polyisocyanates of this kind are the isocyanates containing urethane groups, as obtained by reacting excess amounts of 2,4-diisocyanatotoluene with polyhydric alcohols such as trimethylolpropane and then, where appropriate, removing the unreacted diisocyanate excess by distillation. Examples of further aromatic paint polyisocyanates are the trimers of the monomeric diisocyanates exemplified, i.e., the corresponding isocyanato-isocyanurates, which may have been freed from the excess monomeric diisocyanates following their preparation, preferably by distillation. Within the mixtures of aromatic and (cyclo)aliphatic isocyanates, the amounts of these two components are chosen so as to ensure that the isocyanate groups of the prepolymer are exclusively or at least 90% (cyclo)aliphatically attached.

The polyisocyanate component BA may also be composed of any desired mixtures of the polyisocyanates exemplified.

The mass fraction of units derived from the polyisocyanates BA in the polyurethane resin is generally from about 10 to 50%, preferably from 20 to 35%, based on the mass of the polyurethane resin.

The polyols BB preferably possess a number-average molar mass $M_n$ of from 400 to 5000 g/mol, in particular from 800 to 2000 g/mol. Their hydroxyl number is generally from 30 to 280, preferably from 50 to 200, and in particular from 70 to 160 mg/g. Preference is given to using exclusively difunctional polyols B; however, it is also possible for up to 5% of the mass of the polyols B to be replaced by polyols with a functionality of 3 or more.

Examples of polyols of this kind, which are those compounds known from polyurethane chemistry, are polyether polyols, polyester polyols, polycarbonate polyols, polyesteramide polyols, polyamidoamide polyols, epoxy resin polyols and their reaction products with $CO_2$, polyacrylate polyols, and the like. Polyols of this kind, which may also be used in mixtures, are described, for example, in DE-A 20 20 905, 23 14 513 and 31 24 784, and also in EP-A 0 120 466. It is likewise possible to use castor oil as a polyol component.

Of these polyols, preference is given to the polyether and polyester polyols, especially those which contain only terminal OH groups and possess a functionality of less than 3, preferably from 2.8 to 2, and in particular a functionality of 2.

Examples of polyether polyols that may be mentioned here include polyoxyethylene polyols, polyoxypropylene polyols, polyoxybutylene polyols, and, preferably, polytetrahydrofurans containing terminal OH groups.

The polyester polyols which are particularly preferred in accordance with the invention are the known polycondensates of organic dihydroxy and optionally polyhydroxy (trihydroxy, tetrahydroxy) compounds and dicarboxylic and also optionally polycarboxylic (tricarboxylic, tetracarboxylic) acids or hydroxycarboxylic acids or lactones. Instead of the free polycarboxylic acids it is also possible to use the corresponding polycarboxylic anhydrides or corresponding polycarboxylic esters of lower alcohols to prepare the polyesters. Examples of suitable diols are ethylene glycol, 1,2-butanediol, diethylene glycol, triethylene glycol, polyalkylene glycols, such as polyethylene glycol, and also 1,2- and 1,3-propanediol, 1,4-butanediol, 1,6-hexanediol, neopentyl glycol or neopentyl glycol hydroxypivalate. Examples that may be mentioned of polyols having 3 or more hydroxyl groups in the molecule, which may be used additionally, if desired, include trimethylolpropane, trimethylolethane, glycerol, erythritol, pentaerythritol, ditrimethylolpropane, dipentaerythritol, trimethylol-benzene or trishydroxyethyl isocyanurate.

Suitable dicarboxylic acids include aromatic and cycloaliphatic dicarboxylic acids, linear and branched alkyl- and alkenyl-dicarboxylic acids, and dimeric fatty acids. Suitable examples include the following: phthalic acid, isophthalic acid, terephthalic acid, tetrahydrophthalic acid, hexahydrophthalic acid, cyclohexanedicarboxylic acid, adipic acid, succinic acid, azelaic acid, sebacic acid, glutaric acid, "chlorendic" acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid, octenylsuccinic acid, and dodecenylsuccinic acid. Anhydrides of these acids can also be used where they exist. Here, the anhydrides are embraced by the expression "acid". It is also possible to use minor amounts (amount of substance fraction up to 10%, based on the amount of substance of all acids) of monocarboxylic acids, such as benzoic acid and hexanecarboxylic acid. Saturated aliphatic or aromatic acids are preferred, such as adipic acid or isophthalic acid. As polycarboxylic acids which may be used additionally, if desired, in relatively small amounts, mention may be made here of trimellitic acid, trimesic acid, pyromellitic acid, and also polyanhydrides, as described in DE 28 11 913, or mixtures of two or more such compounds.

The hydroxycarboxylic acids, which can be used as reactants when preparing a polyesterpolyol having terminal hydroxyl groups, are, for example, hydroxycaproic acid, hydroxybutyric acid, hydroxydecanoic acid, hydroxystearic acid. Lactones which can be used in the synthesis of the polyester polyols include caprolactone, butyrolactone, and valerolactone.

The mass fraction of units derived from component BB in the polyurethane resin is normally between 15 and 80%, preferably between 40 and 60%, based on the mass of the polyurethane resin.

The low molecular mass polyols BC which are used if desired for the synthesis of the polyurethane resins generally have the effect of stiffening the polymer chain. They generally possess a molar mass of from about 60 to 400 g/mol, preferably from 60 to 200 g/mol, and have hydroxyl numbers of from 200 to 1500 mg/g. They may contain aliphatic, alicyclic or aromatic groups. Their mass fraction, where they are used, is generally from 0.5 to 20%, preferably from 1 to 10%, based on the mass of the hydroxyl-containing components BB to BD. Suitable examples include the low molecular mass polyols having up to about 20 carbon atoms per molecule, e.g., ethylene glycol, diethylene glycol, 1,2-propanediol, 1,3-propanediol, 1,4-butanediol, 1,2- and 1,3-butylene glycol, 1,2- and 1,4-cyclohexanediol, 1,4-cyclohexanedimethanol, 1,6-hexanediol, bisphenol A (2,2-bis(4-hydroxyphenyl)propane), hydrogenated bisphenol A (2,2-bis(4-hydroxycyclohexyl)propane) and also mixtures thereof, and also, as triols, trimethylolethane and trimethylolpropane. Preference is given to making exclusive or at least predominant use (generally more than 90% of the mass, preferably more than 95%) of diols.

Where compounds BA, BB and/or BC with a functionality of 3 or more are used, it must be ensured that no gelling occurs during the synthesis of the prepolymer. This can be prevented, for example, by using monofunctional compounds along with the trifunctional or higher polyfunctional compounds, the amount of the monofunctional compounds then being chosen preferably such that the average functionality of the component in question does not exceed 2.3, preferably 2.2, and in particular 2.1.

The anionogenic compounds BD contain at least one, preferably at least two, groups which are reactive with isocyanates, such as hydroxyl, amino, and mercaptan groups, and at least one acid group which on at least partial neutralization in aqueous solution or dispersion forms anions. Examples of such compounds are described in U.S. Pat. Nos. 3,412,054 and 3,640,924 and also in DE-A 26 24 442 and 27 44 544, hereby incorporated by reference. Particularly suitable polyols, preferably diols, for this purpose are those containing at least one carboxyl group, generally from 1 to 3 carboxyl groups, per molecule. As groups capable of forming anions, sulfonic acid groups or phosphonic acid groups are also suitable. Examples of compounds BD are, in particular, dihydroxycarboxylic acids, such as α,α-dialkylolalkanoic acids, especially α,α-dimethylolalkanoic acids such as 2,2-dimethylolacetic acid, 2,2-dimethylolpropionic acid, 2,2-dimethylolbutyric acid, 2,2-dimethylolpentanoic acid, and the isomeric tartaric acids, and also polyhydroxy acids such as gluconic acid. Particular preference is given to 2,2-dimethylolpropionic acid. Examples of amino-containing compounds BD are 2,5-diaminovaleric acid (ornithine) and 2,4-diaminotoluene-5-sulfonic acid. It is also possible to employ mixtures of said compounds BD. The mass fraction of units derived from component BD in the polyurethane resin is generally from 2 to 20%, preferably from 4 to 10%, based on the mass of the polyurethane resin.

The compounds BE are located predominantly, preferably to the extent of from 70 to 90%, in each case at the chain ends of the molecules, which they terminate (chain stoppers). Suitable polyols possess at least 3, preferably 3 or 4, hydroxyl groups in the molecule. Examples that may be mentioned here include glycerol, hexanetriol, pentaerythritol, dipentaerythritol, diglycerol, trimethylolethane, and trimethylolpropane, the latter being preferred. As a chain stopper component BE is employed in excess, i.e., in an amount such that the number of hydroxyl groups in the amount of component BE used exceeds that of the isocyanate groups still present in the prepolymer BA-BB-BC-BD. The mass fraction of units derived from component BE in the polyurethane resin is customarily between 2 and 15%, preferably from 5 to 15%, based on the mass of the polyurethane resin. Where appropriate, the units derived from component BE are present in the polyurethane resin in a mixture with the units derived from BF and/or BG.

The compounds BF are monofunctional, NCO-reactive compounds, such as monoamines, especially mono-secondary amines, or monoalcohols. Examples that may be mentioned here include the following: methylamine, ethylamine, n-propylamine, n-butylamine, n-octylamine, laurylamine, stearylamine, isononyloxypropylamine, dimethylamine, diethylamine, di-n-propylamine and di-isopropylamine, di-n-butylamine, N-methylamino-propylamine, diethyl- and dimethyl-aminopropylamine, morpholine, piperidine, and suitably substituted derivatives thereof, amidoamines formed from diprimary amines and monocarboxylic acids, and also monoketimines of diprimary amines, and primary/tertiary amines, such as N,N-dimethylamino-propylamine.

Suitable compounds BF preferably also include those containing active hydrogen differing in its reactivity toward NCO groups, especially compounds which in addition to a primary amino group also contain secondary amino groups, or in addition to an OH group also contain COOH groups, or in addition to an amino group (primary or secondary) also contain OH groups, the latter being particularly preferred. Examples thereof are: primary/secondary amines, such as 3-amino-1-methylaminopropane, 3-amino-1-ethylaminopropane, 3-amino-1-cyclohexylaminopropane, 3-amino-1-methylaminobutane; monohydroxycarboxylic acids, such as hydroxyacetic acid, lactic acid or malic acid, and also alkanolamines such as N-aminoethylethanolamine, ethanolamine, 3-aminopropanol, neopentanolamine and, with particular preference, diethanolamine. If desired, it is also possible to use those compounds BF which, in addition to the isocyanate-reactive groups, also contain olefinic double bonds. Following application to a substrate, the polyurethanes obtained in this way can be crosslinked by exposure to high-energy radiation such as UV rays or electron beams.

In this way, as with the use of the compounds BE, it is possible to introduce additional functional groups into the polymeric end product which is thereby made more reactive toward materials, such as curing agents, where that is desired. The mass fraction of units derived from component BF in the polyurethane resin is customarily between 2 and 20%, preferably between 3 and 10%, based on the mass of the polyurethane resin.

The compounds BG are compounds known as chain extenders. Suitable as such compounds include the compounds known for this purpose which are reactive with NCO groups and are preferably difunctional, are not identical with BB, BC, BD, BE, and BF, and normally have number-average molar masses of up to 400 g/mol. Examples that may be mentioned here include water, hydrazine, and aliphatic linear or branched or cyclic diamines such as ethylenediamine, 1,3-diaminopropane, 1,4-diaminobutane and hexamethylenediamine, which amines may also carry substituents, such as OH groups. Polyamines of this kind are described, for example, in DE-A 36 44 371. The mass fraction of units derived from component BG in the polyurethane resin is customarily between 1 and 10%, preferably between 2 and 5%, based on the mass of the polyurethane resin.

The polyurethane resin of the invention is preferably prepared by first using the polyisocyanates BA, the polyols BB and, where appropriate, the low molecular mass polyols BC and also the compounds BD to prepare a polyurethane prepolymer containing on average at least 1.7, preferably from 2 to 2.5, free isocyanate groups per molecule, then reacting this prepolymer with the compounds BE and/or BF, where appropriate in the form of a blend with small amounts of compounds BG, in a nonaqueous system, using component BE in a stoichiometric excess (the number of hydroxyl groups in BE is greater than the number of isocyanate groups in the prepolymer prepared in the first step), and, preferably, finally neutralizing the fully reacted polyurethane resin and converting it to an aqueous system. If desired, the reaction with BG may also take place following conversion to the aqueous system. The prepolymer should already be of high molar mass; preferably, it has a Staudinger Index $J_0$ of at least 15 $cm^3/g$, more preferably at least 17 $cm^3/g$, and with particular preference at least 19 $cm^3/g$.

The preparation of the polyurethane prepolymer in the first step takes place in accordance with the known methods. The polyfunctional isocyanate BA is used in excess over the polyols BB to BD, so giving a product containing free isocyanate groups. These isocyanate groups are terminal and/or lateral, preferably terminal. The amount of polyisocyanate BA is appropriately such that the ratio of the number of isocyanate groups in the amount of component BA employed to the total number of OH groups in the polyols BB to BD employed is from 1.05 to 1.4, preferably from 1.1 to 1.3.

The reaction for preparing the prepolymer is normally conducted at temperatures from 60 to 95° C., preferably from 60 to 75° C., depending on the reactivity of the isocyanate used, generally in the absence of a catalyst, but preferably in the presence of solvents which are inert toward isocyanates. Particularly suitable solvents for this purpose are those which are compatible with water, such as the ethers, ketones, and esters mentioned infra, and also N-methylpyrrolidone. The mass fraction of this solvent appropriately does not exceed 20%, and is preferably situated in the range from 5 to 15%, based in each case on the sum of the masses of the polyurethane resin and of the solvent. The polyisocyanate is appropriately added to the solution of the other components. It is, however, likewise possible first to add the polyisocyanate BA to the polyol BB and, where appropriate, BC and to react the resulting prepolymer BA-BB-BC with component BD, which has been dissolved in a solvent inert toward isocyanates, preferably N-methylpyrrolidone or ketones, to give the prepolymer BA-BB-BC-BD.

The prepolymer BA-BB-BC-BD or its solution is then reacted with compounds BE and/or BF, where appropriate as a blend with BG, the temperature being appropriately in a range from 50 to 110° C., preferably between 70 and 110° C., until the NCO content of the reaction mixture has fallen virtually to zero. Where compound BE is used, it is added in excess (number of hydroxyl groups in BE exceeds the number of isocyanate groups in the prepolymer BA-BB-BC-BD). The amount of BE is appropriately such that the ratio of the number of NCO groups in the prepolymer, or of the prepolymer which may have already been reacted with compounds BF and/or BG, i.e., BA-BB-BC-BD(BF/BG) to the number of reactive groups of BE is from 1:1.1 to 1:5, preferably from 1:1.5 to 1:3. The mass of BF and/or BG can be from 0 to 90%, preferably from 0 to 20%, based on the mass of BE.

Some of the acid groups which are bound (not neutralized) in the polyurethane thus prepared, preferably from 5 to 30% of them, may where appropriate be reacted with difunctional compounds that are reactive with acid groups, such as diepoxides.

Particularly suitable for neutralizing the resultant polyurethane, which preferably contains COOH groups, are tertiary amines, examples being trialkylamines having from 1 to 12, preferably from 1 to 6, carbon atoms in each alkyl radical. Examples of such amines are trimethylamine, triethylamine, methyldiethylamine, tripropylamine. The alkyl radicals may, for example, also carry hydroxyl groups, as in the case of the dialkylmonoalkanolamines, alkyldialkanolamines, and trialkanolamines. An example thereof is dimethyl-ethanolamine, which is preferably used as neutralizing agent.

As neutralizing agents it is also possible where appropriate to use inorganic bases, such as ammonia or sodium hydroxide and/or potassium hydroxide.

The neutralizing agent is normally used in amounts such that the ratio of the amount of substance of amine groups and/or hydroxyl ions formed in aqueous solution to the amount of substance of the acid groups of the prepolymer is from about 0.3:1 to 1.3:1, preferably from about 0.5:1 to 1:1.

The neutralization, which generally takes place between room temperature and 110° C., may be carried out in any manner desired, for example, in such a way that the aqueous neutralizing agent is added to the polyurethane resin or vice versa. It is, however, also possible first to add the neutralizing agent to the polyurethane resin and only then to add the water. Generally, this gives a mass fraction of solids in the dispersion of from 20 to 70%, preferably from 30 to 50%.

The ready-formulated dispersion may be adapted to the intended application by means of customary additives such as pigments, corrosion inhibitors, leveling agents, antisettling agents, adhesion promoters and defoamers. For the formulation of surfacers, organic or inorganic fillers as well are added to the dispersion, such as carbon black, titanium dioxide, finely divided silica, silicates such as kaolin or talc, chalks, heavy spar or iron oxide pigments; organic fillers which may be used are ground thermoplastics such as polyolefins, polyesters or polyamide; preference is also given to polymers of olefinically unsaturated monomers that are obtainable by emulsion polymerization, including crosslinked polymers in particular. The surfacer compositions may further comprise the customary solvents, especially water-miscible solvents. These surfacers are normally prepared by grinding the fillers and pigments with a portion of the dispersion and with the addition of dispersing auxiliaries, defoamers and other additives in appropriate dispersing equipment such as a bead mill. The particle size of the fillers and pigments is preferably reduced to less than 15 μm. The remainder of the dispersion and any further additives are then added to this preparation in accordance with the target pigment/binder mass ratio of from 0.5:1 to 2.5:1. The mass of the pigments here also includes the mass of the fillers.

The finished formulation may be applied to the substrate by the customary techniques, such as by rolling, by spraying or by roll coating. Particular preference is given to spraying application techniques, such as compressed air spraying, airless spraying or what is known as "ESTA high-speed rotation spraying". After a short flash-off time at room temperature or elevated temperature of up to about 80° C., the film is baked at from about 130 to about 190° C. The film thickness after baking is usually from about 15 to about 120 μm, preferably between 25 and 70 μm.

Addition of the high molecular mass polyurethane B produces a markedly improved characteristic stone-chip value in the baked film. It is also possible to use the polyurethane B as the sole binder for a surfacer composition, in combination with the required amount of curing agent C. While adding even relatively small amounts considerably improves the characteristic stone-chip value of surfacer compositions thus modified, use of the polyurethane B alone provides a further improvement in the characteristic stone-chip value.

The following examples illustrate the invention without being intended to limit its scope.

EXAMPLES

1 Preparation of a High Molar Mass Polyurethane 132 g of adipic acid, 72 g of isophthalic acid, 142 g of 1,6-hexanediol and 42 g of neopentyl glycol were charged to a 1 l round-bottomed glass flask and slowly heated to 250° C., during which the water of reaction was distilled off. This initial charge was held at this temperature until the acid number was below 10 mg/g. Condensation was then continued under reduced pressure until the acid number was below 2 mg/g. This gave a clear polyester having a hydroxyl number of about 77 mg/g. 213 g of this polyester, 26.8 g of dimethylolpropionic acid and 10.4 g of neopentyl glycol were dissolved together in 65.3 g of N-methylpyrrolidone at 100° C. 119.4 g of isophorone diisocyanate were added to this solution; the mixture was held at this temperature until a Staudinger Index ("limiting viscosity") of from 28 to 30 $cm^3/g$ was obtained. The mixture was then cooled to 95° C., 10 g of triethylamine were added, and the mixture was homogenized by stirring. This solution was subsequently dispersed with 410 g of deionized water, a temperature of about 80° C. within a period of less than 10 minutes, and this dispersion was immediately admixed with a solution of 3.1 g of ethylenediamine in 73 g of deionized water. Following a homogenization phase of 1 hour, the batch was cooled. This gave a fine dispersion having a mass fraction of nonvolatiles of about 40%, a viscosity of about 2300 mPa·s and a pH of about 7.6. The acid number of the resin was about 30 mg/g; by gel permeation chromatography against polystyrene standards, the number-average molar mass $M_n$ was found to be 20.9 kg/mol and the weight-average molar mass $M_w$ 41.3 kg/mol.

2 Preparation of the Polycondensate A

2.1 Carboxy-Functional Component AI

A suitable reaction vessel was charged with a solution of 810 g (6 mol) of dimethylolpropionic acid in 946 g of diethylene glycol dimethyl ether (DGM) and 526 g of methyl isobutyl ketone (MIBK). Over the course of 4 hours, a mixture of 870 g (5 mol) of TDI (commercially available isomer mixture of 2,4- and 2,6-tolylene diisocyanate) and 528 g (2 mol) of a TDI semi-blocked with ethylene glycol monoethyl ether was added to this solution at 100° C. As soon as all of the NCO groups had reacted, the batch was diluted to a mass fraction of solids of 60% with a 2:1 mixture of DGM and MIBK. Component A1 had an acid number of 140 mg/g and a Staudinger Index $J_0$ ("limiting viscosity number"), measured in N,N-dimethylformamide (DMF) at 20° C., of 9.3 $cm^3/g$. The semi-blocked TDI was prepared by adding 90 g (1 mol) of ethylene glycol monoethyl ether to 174 g (1 mol) of TDI over the course of 2 hours at 30° C. and then continuing reaction until the mass fraction of NCO groups was 16 to 17%.

2.2 Hydroxy-Functional Component AII

In a suitable reaction vessel, 130 g (1.1 mol) of hexane-1,6-diol, 82 g (0.6 mol) of monopentaerythritol, 8 g (0.05 mol) of isononanoic acid, 28 g (0.1 mol) of ricinene fatty acid (dehydrated castor oil fatty acid) and 50 g (0.3 mol) of isophthalic acid were esterified at 210° C. to an acid number of less than 4 mg/g. The viscosity of a 50% strength solution in ethylene glycol monobutyl ether, measured as the efflux time in accordance with DIN 53211 at 20° C., is 125 seconds; the Staudinger Index $J_0$ ("limiting viscosity number"), measured in N,N-dimethylformamide at 20° C., was 9.8 $cm^3/g$.

2.3 Polycondensate A 35 parts of component AI and 65 parts of component AII were mixed and the mixture was condensed at from 150 to 160° C. until the acid number of the condensate in the reaction mixture was from 41 to 45 mg/g. The Staudinger Index of the reaction product was found to be 16.7 $cm^3/g$.

3 Formulation of the Polycondensate A as a Self-Curing Binder

3.1 Curing Agent 0.7 mol of TDI and 0.3 mol of MDI (bis(4-isocyanatophenyl)methane) were dissolved in 85 g of methyl isobutyl ketone. 0.3 mol of N,N-bishydroxyethyl-2-hydroxyethylurethane (obtainable by reacting equimolar amounts of ethylene carbonate and diethanolamine) was added to the mixture at room temperature with stirring, after which the temperature was raised, utilizing the exotherm which occurred, to 50° C. After all of the material had dissolved, the mixture was held at 50° C. for 1 hour more. 1.1 mol of 3,5-dimethylpyrazole were then added dropwise over the course of an hour, during which the temperature rose to 80° C. as a result of the exotherm. With occasional cooling, this temperature was maintained until isocyanate groups were no longer detectable. The methyl isobutyl ketone was subsequently distilled off under reduced pressure, after which the batch was diluted with methoxypropanol to a mass fraction of solids of from 60 to 70%.

3.2 Self-Curing Binder

For preparing the self-curing binder, the polycondensate A from example 2.3 was adjusted to a degree of neutralization of 100% with dimethylethanolamine at from 70 to 100° C. and was then diluted with deionized water to a supply-form viscosity of about 100 mPa·s. Subsequently, with thorough stirring, the curing agent from example 3.1 was added slowly, after which stirring was continued for 5 minutes. The ratio of the masses of condensate A and curing agent was set at 70:30 (based in each case on resin solids).

4 Testing of the Binders of the Invention as Automotive Surfacers

The surfacers 1 to 4 were formulated as indicated in table 1. The masses of the substances used are stated in g.

TABLE 1

| | Surfacer 1 | Surfacer 2 | Surfacer 3 | Surfacer 4 |
|---|---|---|---|---|
| polyurethane **B** from example 1 | 105 | 25.5 | 51 | — |
| self-curing binder from example 3.2 | — | 100.6 | 94.3 | 105 |
| wetting agent (®Surfynol 104 E)* | 1.2 | 1.2 | 1.2 | 1.2 |
| deionized water | 28.5 | 27 | 27.5 | 25 |
| titanium dioxide (®Kronos 2190) | 60 | 52 | 53 | 51 |
| filler (barium sulfate; average particle size 1 μm) | 60 | 52 | 53 | 51 |
| polyurethane **B** from example 1 | 150 | — | — | — |
| self-curing binder from example 3.2 | — | 118 | 100 | 138 |
| hexamethoxy-methyl melamine+ | 18 | 1.8 | 3.6 | — |

+: hexamethoxymethyl melamine with a mass fraction of solids of from 96 to 100%

*: 2,4,7,9-tetramethyl-5-decyne-4,7-diol, in solution in glycol (50 cg in 1 g of solution)

Surfacer 4 (which is not modified with the high molar mass polyurethane B) was used for comparison.

The surfacers were applied to cleaned glass plates using a 150 μm doctor blade and following a 15 minute flash-off were baked at 165° C. for 25 minutes. In all cases a dry film thickness of 35 μm was obtained. After storage for 1 hour following baking, the coatings were investigated for their pendulum hardness and gloss; uniformity of the paint surface and its freedom from defects were assessed by inspection.

In order to test the characteristic stone-chip value, the surfacers were applied using a compressed-air gun to a zinc-phosphatized steel panel (Bonder 26 60° C.) coated with a cathodically deposited electrocoat primer (about 25 μm, baking at 175° C., 30 min). The surfacers were cured in a forced-air oven at 165° C. for 20 minutes. In all cases a dry film thickness of 35±2 μm was obtained. Applied to the surfacer coat was a commercial, melamine-resin-cured, automotive acrylic resin topcoat material which was cured at 140° C. for 30 minutes (dry film 40±2 μm). After baking, the panels were stored under standard conditions for about 1 hour. The resistance properties of the films (solvent resistance, water resistance) and the mechanical values corresponded to the requirements of the art for all of the coatings. The stone-chip resistance was tested in accordance with the VDA [German Automakers' Association] standard 621–427 using a stone-chip tester (Erichsen, model 508) at +20° C. with twofold bombardment in each case with 0.5 kg of steel shot (edgy, average diameter 4 to 5 mm, bombardment with compressed air at 0.2 MPa (2 bar)). The bombardment patterns obtained were evaluated in accordance with the standard. The test results are compiled in table 2 below.

TABLE 2

| | Surfacer 1 | Surfacer 2 | Surfacer 3 | Surfacer 4 (compar.) |
|---|---|---|---|---|
| appearance | defect-free | defect-free | defect-free | defect-free |
| pendulum hardness* in s | 70 | 95 | 90 | 98 |
| gloss+ | 70 | 80 | 75 | 85 |
| characteristic stone-chip value | 0 to 1 | 1 to 2 | 1 | 2 to 3 |

*: König pendulum hardness (DIN 53 157)

+: The gloss was determined on the glass plates in accordance with DIN 67 530 at an angle of 60°.

Result:

In comparison with a prior-art surfacer (surfacer 4), a marked improvement in the characteristic stone-chip value is evident when high molar mass polyurethane is added to such a surfacer. The improvement in the stone-chip test is particularly marked when the polyurethane is used as sole binder in combination with an appropriate curing agent.

What is claimed is:

1. A coating composition comprising a condensation product A of a carboxyl-containing resin A1 and a hydroxyl-containing resin A2, a water-soluble or water-dispersible, high molar mass polyurethane B having a number-average molar mass $M_n$ (measured by gel permeation chromatography, calibration with polystyrene standards) of at least 10 kg/mol and a weight-average molar mass $M_w$ of at least 20 kg/mol, and a curing agent C which becomes active only at an elevated temperature of at least 80° C.

2. The coating composition as claimed in claim 1, wherein the curing agent C is a mixture of a blocked isocyanate C1 and a water-dilutable amino resin C2.

3. The coating composition as claimed in claim 2, wherein the mass fraction of the polyurethane B is from 2 to 30%; the mass fraction of the curing agent C2 is from 0.3 to 6%; and the sum of the mass fractions of the condensation product A and the curing agent C1 is from 64 to 97.7%.

4. A process for preparing a coating composition as claimed in claim 1, which comprises mixing a condensation product A with a high molar mass polyurethane B and a curing agent C.

5. A process for preparing a coating composition as claimed in claim 4, which comprises mixing a condensation product A with a blocked isocyanate C1 as curing agent, and adding a high molar mass polyurethane B and a water-dilutable amino resin C2 to this mixture.

6. The process as claimed in claim 4, wherein the condensation product A is prepared by reacting a carboxyl-containing resin A1 and a hydroxyl-containing resin A2 under condensation conditions at a temperature of from 80 to 180° C., the reaction being conducted until the condensation products have an acid number of from about 25 to about 75 mg/g and a Staudinger Index of from about 13.5 to about 18 $cm^3/g$, measured in dimethylformamide as solvent at 20° C.

7. The process as claimed in claim 4, wherein the polyurethane B is prepared by reacting polyisocyanates BA with polyols BB having a number-average molar mass $M_n$ of at least 400 g/mol, low molar mass polyols BC, if desired, and compounds BD which have at least two groups which are reactive toward isocyanate groups and at least one group which is capable of forming anions, to give a prepolymer which contains free NCO groups and has a Staudinger Index of at least 15 $cm^3/g$, at least partly neutralizing the group capable of forming anions in the compound BD to form anionic groups, dispersing this prepolymer in water, and reacting the neutralized prepolymer with at least one component selected from low molar mass polyols BE, which carry no further reactive groups relative to isocyanate groups, these compounds being used in excess, compounds BF, which are monofunctional toward isocyanates or contain active hydrogen of different reactivity and are different from the compounds BE, and also compounds BG, which are different from BB, BC, BD, BE and BF and contain at least two groups which are reactive with isocyanate groups.

8. A method of use of a coating composition which comprises applying the coating composition of claim 1 as a surfacer material for automotive finishing.

* * * * *

UNITED STATES PATENT AND TRADEMARK OFFICE
CERTIFICATE OF CORRECTION

PATENT NO. : 6,824,834 B2
DATED : November 30, 2004
INVENTOR(S) : Markus A. Schafheutle et al.

It is certified that error appears in the above-identified patent and that said Letters Patent is hereby corrected as shown below:

Title page,
Item [56], References Cited, FOREIGN PATENT DOCUMENTS, the second reference should read
-- CA 2,033,530 A1 7/1991 --.

Signed and Sealed this

Twenty-sixth Day of April, 2005

JON W. DUDAS
*Director of the United States Patent and Trademark Office*